United States Patent [19]

Kasselman

[11] Patent Number: 5,205,242
[45] Date of Patent: Apr. 27, 1993

[54] PET FOOD CONTAINER

[76] Inventor: Leslie L. Kasselman, 11550 Sage Canyon, Houston, Tex. 77089

[21] Appl. No.: 801,716

[22] Filed: Dec. 2, 1991

Related U.S. Application Data

[63] Continuation-in-part of Ser. No. 610,577, Nov. 8, 1990, Pat. No. 5,069,167.

[51] Int. Cl.$^5$ ............................................. A01K 5/01
[52] U.S. Cl. ........................................ 119/61; 119/63
[58] Field of Search ................... 119/61, 51.5, 59, 63

[56] References Cited

U.S. PATENT DOCUMENTS

| | | | |
|---|---|---|---|
| 1,552,076 | 9/1925 | Mosier | 119/61 |
| 2,191,811 | 2/1940 | Trampier | 119/61 |
| 2,772,660 | 12/1956 | Saul | 119/61 |
| 3,202,131 | 8/1965 | Jones | 119/61 |
| 3,441,003 | 4/1969 | Du Mond et al. | 119/61 |
| 4,827,874 | 5/1989 | Mahan | 119/61 |
| 4,981,108 | 1/1991 | Faeroe | 119/61 |
| 5,069,166 | 12/1991 | Ahuna | 119/61 |
| 5,069,167 | 12/1991 | Kasselman | 119/61 |

Primary Examiner—John G. Weiss
Attorney, Agent, or Firm—Harrison & Egbert

[57] ABSTRACT

A pet food container having a dish member with a concavity formed therein and a base member having a liquid-receiving moat formed therein. The dish member has a connector formed on a bottom surface of the concavity which is detachably engagable with a central member formed on the base member. The base member has a raised rim extending outwardly from an outer periphery of the bottom surface. The dish member includes an upper surface above the concavity with a configuration which is nestable within the moat of the base member. The central member of the base member has a generally cylindrical configuration. The flat bottom surface of the base member includes an interior recess which is selectively engagable with the connector of the dish member. A copper strip extends circumferentially around the exterior surface of the rim. A clamp is provided in resilient relationship with the base member so as to extend through a hole in the base member between a retracted position and an extended position.

8 Claims, 5 Drawing Sheets

PET FOOD CONTAINER

RELATED APPLICATION

The present application is a continuation-in-part application of U.S. patent application Ser. No. 07/610,577, filed on Nov. 8, 1990. This patent application has matured into U.S. Pat. No. 5,069,167, issued on Dec. 3, 1991, and entitled "Pet Food Container".

TECHNICAL FIELD

The present invention relates generally to apparatus for feeding animals. More particularly, the present invention relates to dishes or bowls for feeding pets and for preventing insects from entering the food containing area of the dish.

BACKGROUND ART

Feed trays or bowls for feeding animals are generally known. Also known are animal feeders which are comprised of two or more sections as well as bowl feeders which include means for repulsing or trapping insects seeking access to the bowl portion.

The problem of insects intruding into the feed bowls of animals is a great problem. In the southern areas of the United States, it is quite common for fire ants to crawl up the side of the feed bowl and enter into the food containing area of the feed bowl. As such, when a pet desires to eat food from his bowl, the ant may sting the mouth of the pet or otherwise injure the pet. It has been found that the stinging of an animal's mouth by an insect within the feed bowl will tend to discourage the animal from receiving food from such a feed bowl. Often, the stings of fire ants, and other insects, can be injurious and even fatal to the pet.

Prior attempts have been made of isolating the food from the insects. Unfortunately, many of these prior art attempts have been ineffective in preventing the intrusion of insects into the bowl. Also, the mechanisms used for preventing the intrusion of insects into the feed bowl have been both complicated, messy, difficult to utilize, and otherwise inconvenient. Further, and additionally, since the cost of an animal feed bowl is of concern to pet owners, it is preferable to design such an insect proof feed bowl which is not costly to manufacture or sell.

Another common problem for pet food bowls is that they are commonly knocked over, thereby spilling food or water everywhere. If the pet food bowl is of a type that is suitable for preventing insect intrusion, then the bowl is usually pushed so as to be adjacent a surface that acts as a bridge for insects. As such, it was felt to be important to design an insect-proof pet bowl that could be fixed in position.

A major problem for most outdoor pet food bowls is the intrusion by slugs. Slugs will commonly crawl along the ground and crawl through the pet food bowl. Such slugs carry with them the risk of disease and contamination for the pet. Additionally, slug intrusion is likely to cause unsightly slime to occur across the body of the pet food container.

During times of transport and storage, it is possible for much of the pet food to spill over the side of the bowl. It is desirable to have a convenient way to contain the pet food in the bowl during transport. Additionally, with conventional pet food containers, it is difficult to properly, stack and store a large number of such containers. They are not particularly designed so as to present a convenient stackage and storage configuration.

It is an object of the present invention to provide an insect-proof pet food container that effectively prevents the intrusion of non-flying insects and pests into the food area of a feed bowl.

It is another object of the present invention to provide a pet food container that can be easily stacked and stored.

It is another object of the present invention to provide a pet food container which has nestable components.

It is still a further object of the present invention to provide a pet food bowl that is generally slug-proof.

It is still another object of the present invention to provide a pet food container that is easy to utilize, easy to assemble, and inexpensive to manufacture.

It is still another object of the present invention to provide a pet food container that can be conveniently fixed to a surface.

These and other objects and advantages of the present invention will become apparent from a reading of the attached specification and appended claims.

SUMMARY OF THE INVENTION

The present invention is a food container, preferably a pet food container, which comprises a dish member having a concavity formed therein and a base member connected to the dish member which has a liquid-receiving moat formed therein. The dish member has a connector formed on the bottom surface of the concavity. The base member has a generally flat bottom surface and a raised rim which extends outwardly from an outer periphery of this bottom surface. A central member is provided within the base member so as to allow for the detachable engagement with the connector of the dish member. The rim and the central member define a liquid-receiving moat within the base member. The dish member includes an upper surface above the concavity which has a configuration nestable within the moat of the base member.

The concavity has an area which is larger than the central member of the base member. This concavity surrounds the central member when the upper surface of the dish member is in nested relationship with the moat of the base member. A spring clip is provided so as to releasably engage an edge of the dish member and an edge of the base member when the upper surface of the dish member is in nested relationship with the moat. The spring clip causes the upper surface to be in pressurized contact with the moat.

The central member of the base member is a generally cylindrical member. The generally flat bottom surface of the base member has an interior recess which is engagable with the connector of the dish member. The central member has an outer portion slidably engaging the connector of the dish member. The connector of the dish member is an annular collar which can be integrally formed with a dish member or can be fastened thereto.

The dish member has an outwardly angled side wall. The dish member is positioned above the base member such that the angled side wall of the dish member is separated from the rim of the base member. A copper strip extends circumferentially around an exterior surface of the rim of the base member so as to prevent slug intrusion.

A hole is formed within the base member so as to receive a clamp therethrough. The clamp can be utilized so as to fasten the base member to an exterior surface. The clamp is in resilient relationship with the base member such that the clamp is movable between a retracted and an extended position through the hole in the base member.

DETAILED DESCRIPTION OF THE INVENTION

Figure 1:
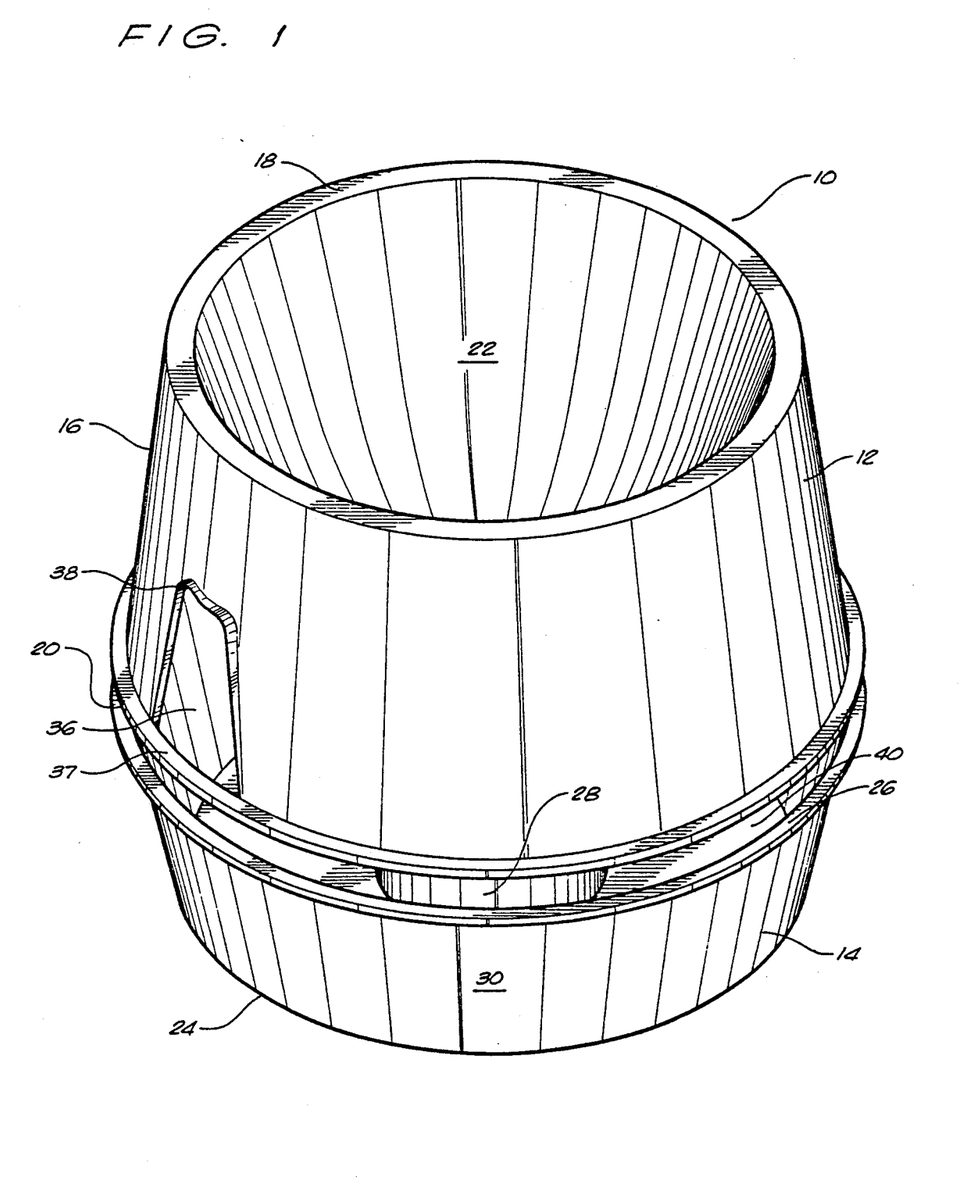
FIG. 1 is a perspective view showing the preferred embodiment of the present invention.

Referring to FIG. 1, there is shown at 10, the ant-proof pet food container in accordance with the preferred embodiment of the present invention. The pet food container 10 comprises the dish member 12 and the base member 14. Dish member 12 has an outwardly angled side wall 16 that extends from the top edge 18 to the bottom edge 20 of dish member 12. The dish member 12 also includes a concavity 22 that is formed in the upper surface 18 of dish member 12. The concavity 22 is suitable for the receipt of pet food. Concavity 22 has a generally semi-spherical shape that extends downwardly into the dish member 12. In essence, the concavity 12 forms the dish of the pet food container 10 of the present invention. Within the concept of the present invention, it is possible, and potentially desirable, to place a stainless steel liner within the concavity 22.

The base member 14 has a generally flat bottom surface 24. The base member 14 also has a raised rim 26 that extends upwardly from the outer periphery of bottom surface 24. A central member 28 extends upwardly from the interior of base member 14. Central member 28 receives the connector of dish member 12 so as to join the dish member 12 to the base member 14. The area between the rim 26 and the central member 28 within the base member 14 acts as a liquid-receiving moat. The dish member 12 is positioned above the base member 14 such that the angled side wall 16 of dish member 12 is separated from the rim 26 of the base member 14.

Specifically, it can be seen that the base member has a body portion 30. The base member 14 has a bottom surface 24 that is generally flat and suitable for placement on any level surface.

Of particular note is the inclusion of a window area 36 which is formed within the angled side wall 16 Of dish member 12. This window area 36 has a generally semicircular shape that extends near the bottom edge 20 of the angled side wall 16. The window area 36 also has a ledge 38 that is formed along the top edge of the window area 36. This ledge serves to deflect materials from passing into the window area 36. Window area 36 is suitable for allowing a liquid to be poured therethrough and into the moat area 40 of the base member 14. A thin strip 37 is formed below window area 36. This thin strip 37 serves to stabilize the shape of dish member 12 and to assist in the molding process.

The bottom edge 20 of the angled side wall 16 of the dish member 12 has a greater diameter than the diameter of the rim 26 of base member 14. The bottom edge 20 of the dish member 12 is separated by a distance of one-half inch or greater from the rim 26 of base member 14. The dish member 12 is suspended in a level condition above the base member 14 by the use of the central member 28 and a connector (not shown). The connector is attached to the bottom side of the concavity, 22 of dish member 12.

Figure 2:
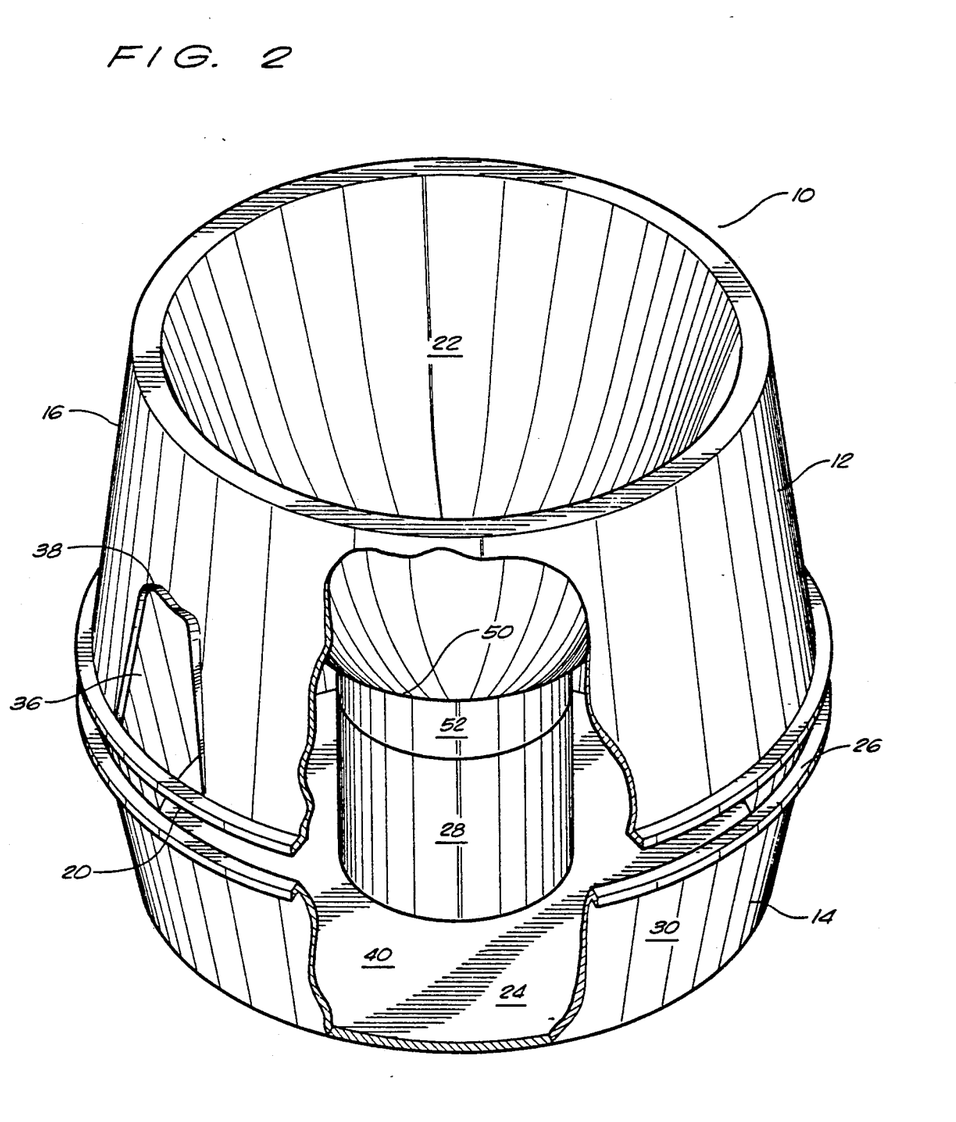
FIG. 2 is a cutaway perspective view of the present invention showing, in particular, the interior configuration of the present invention.

FIG. 2 shows a cutaway view of the configuration of the pet food container 10 in accordance with the preferred embodiment of the present invention. It can be seen that the dish member 12 includes the concavity 22 formed in its upper surface. The concavity extends downwardly into the dish member 12 so as to form a bottom surface at 50 on the interior of the angled walls 16 of dish member 12. The angled wall is a generally thin section of plastic that extend downwardly, in the form of an apron, around the concavity 22. The bottom edge 20 extends lower than the bottom surface 50 of the concavity 22. As can be seen, a connector 52 is connected to the bottom edge 50 of the concavity 22. The connector 52 is suitable for sliding engagement with the exterior surface of the central member 28 of the base member 14. Connector 52 is a collar of annular configuration that is centrally mounted to the bottom surface 50 of the concavity 22. The collar 52 will extend downwardly even with lower edge 20 of the angled side walls 16 of dish member 12.

In FIG. 2, it can be seen that the base member includes the rim 26. Rim 26 forms the upper edge of the base member 14. Base member 14 has a smooth outer surface. In the cutaway view, it can be seen that the central member 28 is centrally located along the bottom surface 24. The area between the central member 28 and the inner walls of the lower body portion 30 and the upper body portion 32 form the moat 40. Moat 40 is suitable for the receipt of a liquid, such as water.

Also in FIG. 2, it can be seen how the window area 36 opens to the interior of the base member 14. As such, water can easily be poured through the window area 36 so as to fill the moat 40 of the base member 14. Also, a simple viewing through the window area 36 can inform the user as to whether the moat area 40 has a suitable level of water for the prevention of insect intrusion.

Figure 3:
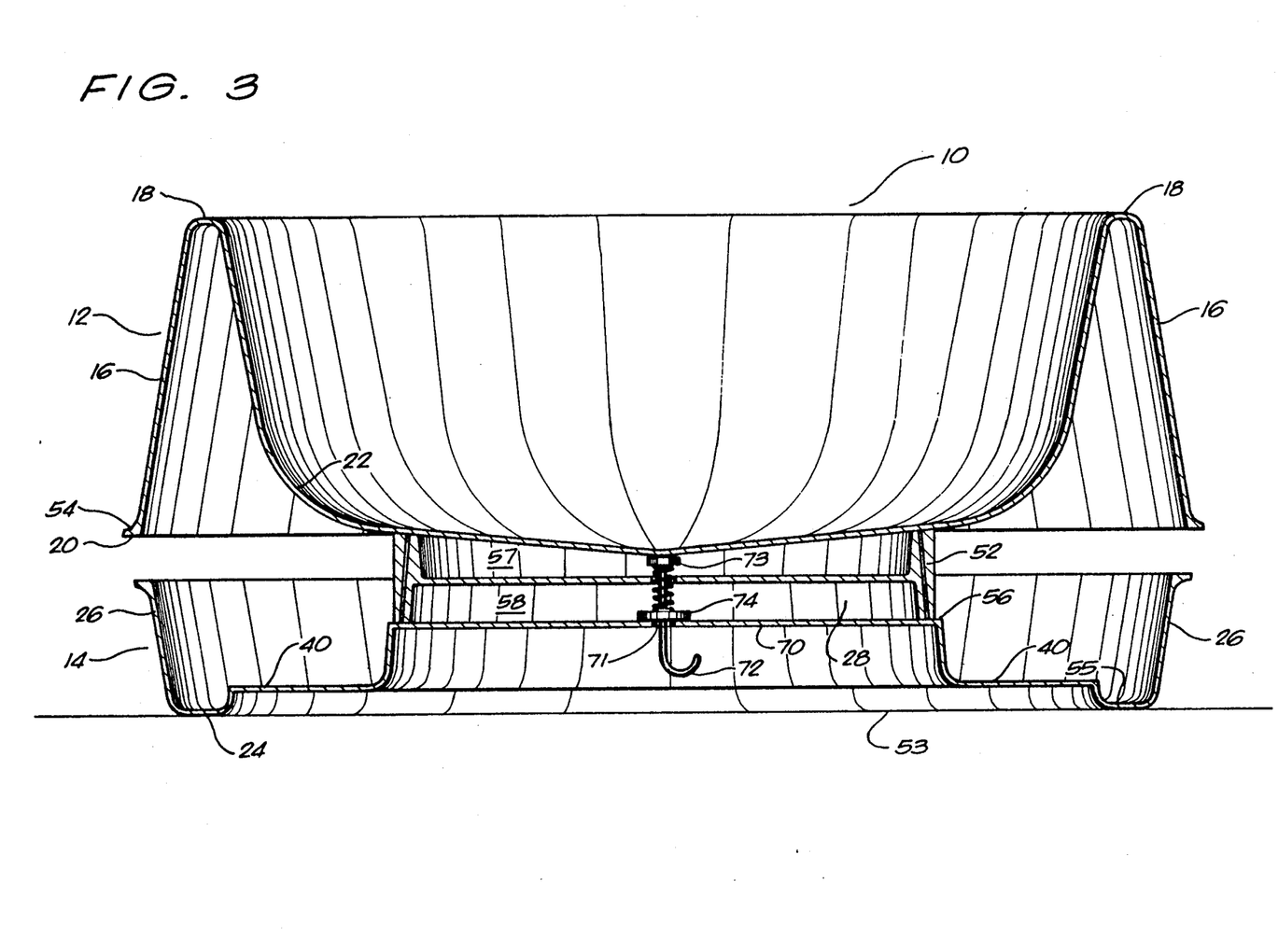
FIG. 3 is a cross-sectional view showing the assembled pet food container in accordance with the preferred embodiment of the present invention.

FIG. 3 is a cross-sectional view of the interior of the pet food container 10 of the present invention. It can be seen in FIG. 3 that the pet food container 10 includes the dish member 12 and the base member 14. It can be seen that the dish member 12 has an outwardly angled side wall 16 which extends from the top surface 18 to the bottom edge 20 of the dish member 12. The concavity 22 is formed so as to be suitable for the receipt of a pet food. It can be seen that the dish member 12 is positioned above the base member 14 such that the angled side wall 16 of the dish member 12 is separated from the rim 26 of the base member 14. In this manner, any food which would spill from the concavity 22 would pass along angled side wall 16 and over the ledge 54. It would be very difficult for any food to enter the opening between the dish member 12 and the base member 14. It can also be seen that the dish member 12 includes the connector 52 which suitably fastens onto the central member 28 of base member 14.

Base member 14 has a generally flat bottom surface 24. The flat bottom surface 24 is shown as resting on a flat exterior surface 53. The flat surface 53 can be the earth, a floor, or it can be a cage or other enclosure. The area between the rim 26 and the central member 28 defines the moat 40. Of particular interest is the indented bottom portion 55 which is formed into the base member 14. The indented portion 55 found on the base member 14 is suitable for receiving the top surface 18 of the dish member 12 in a nesting type of relationship, to be described hereinafter.

It can be seen that the base member 14 has a formed central member 28 which includes a shoulder 56 for receiving the connector 52 in abutment therewith. The cylindrical sections 57 and 58 extend upwardly from shoulder 56 so as to provide an area over which the connector 52 can slidably fit. Each of the sections 57 and 58 is annular in configuration so that the concavity 22 of the dish member 12 can be adequately supported therein.

An important feature shown in FIG. 3 is the inclusion of the surface 70 extending across the annular interior of the central member 28. Surface 70 has a hole 71 formed therein. Hole 71 is suitable for allowing a clamping member 72 to pass therethrough. Clamping member 72 is particularly designed so as to allow the easy fastening of the base member 14 to an exterior surface, such as a cage. The clamping of the base member 14 to the exterior surface will prevent easy movement of the pet food container 10. It will also serve to fix the pet food container 10 into a proper position for use and for serving.

The clamp 72 is a hook-like member having a bolt 73 fastened to one end of the clamp 72 on the interior of the cylindrical sections 57 and 58. A washer 74 is placed around the clamp member 72 adjacent to the hole 71 in surface 70. As such, the washer 74 provides a support surface for retaining the clamping member 72 in its proper position therein. A spring 75 is interposed between the bolt 73 and the washer 74 so as to provide a resilient configuration of the clamp 72 within the central member 28 of the base member 14. In order to actuate the clamping member 72, it is only necessary to press downwardly on the bolt 73 so as to cause the hook-like clamp 72 to travel downwardly for engagement with an exterior surface. By releasing an external force from the bolt 73, the resilient nature of the clamping member 72 will urge it into its original position so as to establish a positive clamp on the exterior surface.

As an alternative embodiment of the present invention, it is possible to remove the clamping member 72. When the clamping member 72 is removed, only the hole 71 in the surface 70 of central member 28 remains. As such, a proper hole is arranged so as to receive a stake, or other means, for fastening the base member 14 onto the earth 53. As such, the use of the present invention is proper with either the clamping member 72 or simply with a stake driven through the open hole 71.

Figure 4:
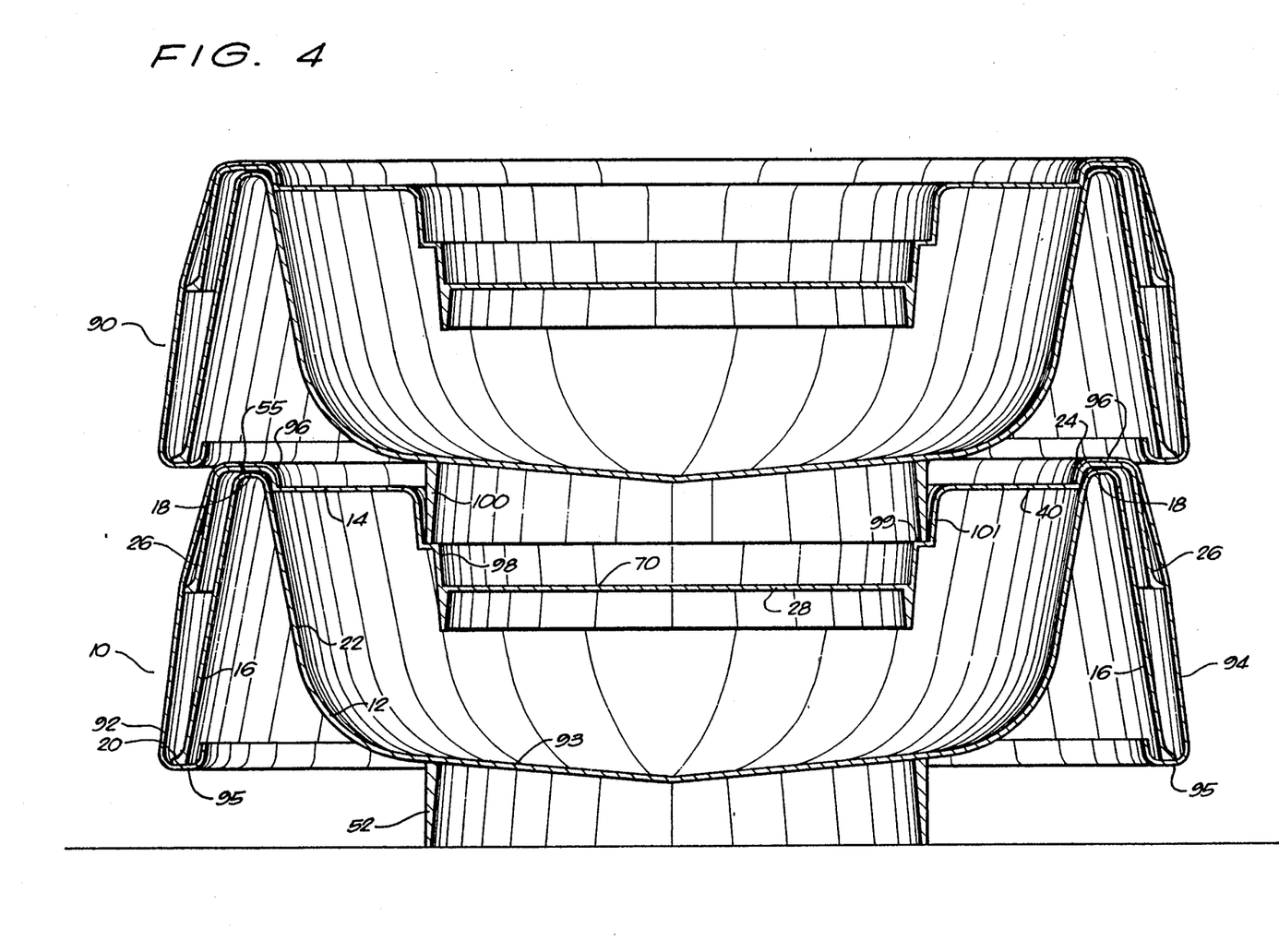
FIG. 4 is a cross-sectional view showing a stacked and nested arrangement of pet food containers in accordance with the preferred embodiment of the present invention

FIG. 4 shows an important feature of the present invention. In particular, FIG. 4 shows the manner in which the dish member 12 can be nested within the base member 14. Additionally, it can be seen in FIG. 4 how one pet food container 10 can be placed, in stacked relationship, with a second pet food container 90. Additionally, FIG. 4 shows the manner in which a spring clip 92 can be used so as to affix the dish member 12 and the base member 14 in their nested relationship.

In particular, FIG. 4 shows the first pet food container 12 as having the dish member 12 in an upright position. The connector 52 extends downwardly from the bottom 93 of the concavity 22. As was stated earlier, the connector 52 is a generally annular collar that can be affixed to the bottom surface 92 or can be molded integrally therewith. The top surface 18 is shown in abutment with the base member 14 on one side of the previously flat bottom surface 24. The indented portion 55 is shown in abutment with the top surface 18 of the dish member 12. The angled side wall 16 extends downwardly from the top surface 18 within the area of the rim 26 of base member 14. Importantly, it can be seen that the bottom surface 24 of the base member 14 has a diameter extending farther than the diameter across the upper surface 18 of the dish member 12. The concavity 22 has an area which is larger than the central member 28 of base member 14. As such, the concavity 22 surrounds the central member 28 when the upper surface 18 of the dish member 12 is in its nested relationship with the moat area 40 of the base member 14. Each of the members of the pet food container 10 of the present invention interact so as to provide a proper closure to the food-receiving concavity 22 of the dish member 12.

In view of the nested type of relationship shown in FIG. 4, the interior of the concavity 12 is properly closed. However, in order to accomplish the purposes of the present invention, it is desirable to offer a clamping system whereby the base member 14 is affixed to the dish member 12 so as to generally seal the interior of the cavity 22. This technique is accomplished by the inclusion of spring clips 92 and 94. One end 95 of the spring clip 92 engages the bottom 20 of the angled side wall 16 of the dish member 12. The other end 96 engages the flat bottom surface 24 around indentation 55 of base member 14. It can be seen that the spring clip 92 has curved ends which wrap around the engaging surfaces of the pet food container 10. The spring clip 92 has a sufficient strength so as to compress the top surface 18 against the moat area 40 of the base member 14. When the spring clips 92 and 94 are placed into the proper position, the pet food container 10 can be easily transported from one place to another. The sealing nested relationship of the base member 14 within the concavity 12 retains any liquids or solids within the interior of the concavity 22. The surface 70 provides further assurance of the retention of the materials therewithin. The nested relationship shown in FIG. 4 also facilitates the ability to store the pet food container 10 of the present invention.

Another feature shown in FIG. 4 is the ability to stack each of the pet food containers 10 and 90. Initially, it can be seen that the central member 28 of base member 14 includes an interior recess 98. Interior recess 98 extends inwardly from the flat bottom surface 24. The interior recess 98 generally corresponds with the shape of the central member 28. It can be seen that shoulders 99 are formed within this interior recess.

In order to enhance the ability to stack each of the pet food containers 10 and 90, it can be seen that the connector 100 of pet food container 90 is received in generally sliding relationship within the annular interior of cylindrical section 101. The end of the connector 100 abuts the shoulder 98 of the shoulder 99 of the interior recess 98. As such, the second pet food container 90 can be received within recess 98. Additional pet food containers can continue to be stacked within the corresponding interior recesses of stacked containers. The arrangement of FIG. 4, in the stacked configuration, facilitates the ability to ship the pet food containers, to store the pet food containers, and to maintain the pet food containers on store shelves. The configuration minimizes the amount of space required for such activities.

Figure 5:
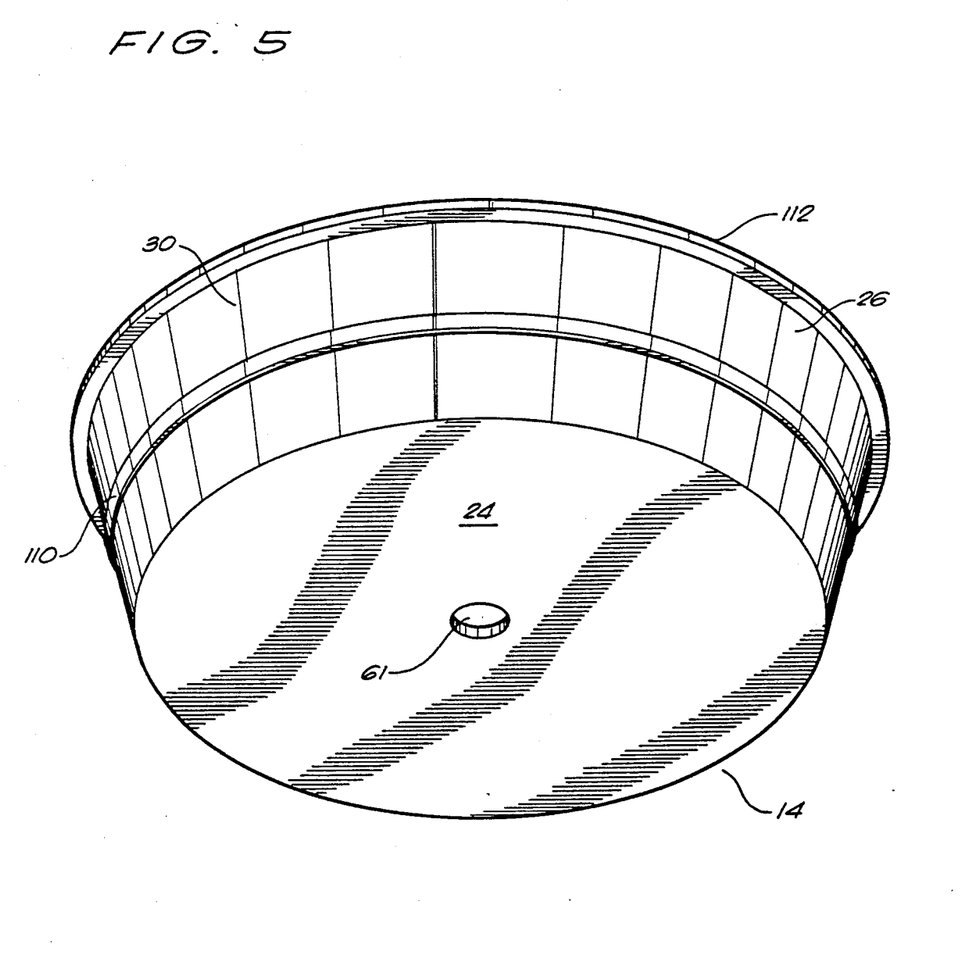
FIG. 5 is a perspective view showing the bottom side of the base member in accordance with the preferred embodiment of the present invention.

FIG. 5 shows a bottom perspective view of a simplified form of the base member 14 showing, in particular, the body portion 30 and bottom surface 24. Of particular note in FIG. 5 is the inclusion of a hole 61 that is formed centrally in the bottom surface 24. Hole 61 extends through the thickness of body surface 24 so as to open to the interior of the collar 52. Hole 61 should be of a suitable size so as to allow a stake, or other rigid member, to be inserted therethrough. In use, the hole 61 receives a stake so as to allow the base member 14 to be rigidly attached to a surface, such as the ground. The stake can be inserted by hand, hammered, or otherwise passed through the hole 61. Once the stake is inserted through hole 61, and the base member 14 fastened to the ground, then it becomes very difficult to move, dislodge, tip over, or otherwise displace the pet food container 10 of the present invention.

In FIG. 5, it can be seen that a metallic strip 110 has been positioned so as to extend circumferentially around the rim 26 of the base member 14. Ideally, the metallic strip 110 is made of a copper material. The strip 110 extends continuously around the periphery of the rim 26 and is positioned generally below the top edge 112 of base member 14. The purpose of the strip 110 is to prevent the intrusion of slugs into the food or into the water moat of the pet food container 10 of the present invention. After experimentation, it has been found that the use of a copper strip effectively prevents the movement of slugs thereacross. It is believed that the electrolytic or electrochemical reaction between the slug body and the metallic material of the strip 110 strongly dissuades the slug from crossing the boundary defined by the strip 110. As such, the present invention can be particularly designed to present intrusion of ants and slugs into the food receiving concavity of the present invention.

The present invention achieves a number of advantages not found in prior pet food containers. Most importantly, the configuration of the present invention allows for manufacture at minimal cost. Since the pet food bowl is a relatively simple item, consumers are not accustomed to paying high prices for such a pet food bowl. Complex arrangements for the prevention of ant intrusion into the pet food containers have required relatively expensive molding procedures in the past. It is a goal to minimize the cost of the molding techniques used for the manufacture of the present invention. By the simple two-piece construction of the present invention, a simple mold can be created that will allow for the production of the entire pet food container 10. Since there are no complex arrangements of components, designs, shapes, or edges, the costs of the molds, along with the costs of the manufacturing, are considerably reduced. The simple two-piece construction is not shown, nor described in the prior art previously.

Another advantage of the present invention is the fact that the bottom edge 20 of the angled side wall 16 of dish member 12 extends slightly outward beyond the rim 26 of the base member 14. As such, any overflow of the dish 22, or any messiness by the pet using the pet food container 10, will cause the food and liquid to flow over the exterior of the base member 14, rather than flowing into the water contained within moat 40. It has been found that, when food particles find their way onto the surface of the water within the moat 40, insect bridges can be built from these food particles. Also, the food residing within the water on the interior of base member 14 can serve to attract insects. As such, it has been found to be desirable to prevent food from entering into the interior of base member 14.

The inclusion of the window 36 solves a major problem of prior art devices. The window 36 can be used to see the level of the water within moat 40 and also can be used to allow the user to fill the moat 40 without moving the pet food container 10. A great deal of sloppiness, spillage, and other problems can result when it is necessary to move or disassemble the pet food container. To accommodate those problems, the window 36 was developed so as to simplify procedures. Also, the inclusion of the deflector 38 above the window 36 also assists in preventing the intrusion of food into the water contained within moat 40.

By the use of the configuration shown by the present invention, the dish member 12 has a greater diameter than the base member 14. As such, any condensation of the water from the moat 40 of base member 14 will accumulate on the interior of dish member 12. The condensation will then flow back into the moat 40 of the base member 14. As such, the water supply contained within the moat 40 of the base member 14 will last for a longer period of time and will not require refilling as it would if the moat were exposed to the open air.

By staking the base member 14 to the ground, through the use of the hole 61, the present invention is stabilized. As such, it becomes very difficult to tip the pet food container 10 over. It also becomes difficult to push the pet food container 10 next to something that can act as a bridge between the base member 14 and the dish member 12. In normal usage, dogs, and other pets, will have a tendency to push their food container next to a surface. By staking the base member 14 to the ground, the pet can no longer force the container 10 into a position that will allow ants or other non-flying insects to enter.

The specific configuration of the present invention enhances the ability to store, display, and transport the pet food container of the present invention. Since the present invention has been designed so as to allow the base section to cover the concavity, or food-receiving area, of the dish member 12, the base member effectively serves as a lid to the pet food container. In use, the base member is simply removed, as a lid, and placed into its proper position below the dish member for the purposes of feeding an animal. The use of the recess on the bottom surface of the base member 14 properly interacts with the connector of the dish member so as to provide a suitable technique for stacking and display of the pet food container of the present invention. Many of the containers can be piled, one on top of one another, so as to allow a maximum number of pet food containers to be received within a given area.

The use of the copper band around the periphery of the base member serves to produce a mild electrical charge with the body of a slug. As such, it effectively prevents the intrusion of slugs, and related animals, into either the water moat or into the food area of the pet food container.

The present invention further provides a clamp which allows the pet food container to be effectively attached to a cage or to another exterior surface. The clamping mechanism can be included within the pet food container, as sold, or it can be attached whenever needed. The clamp is a flexible and resilient member which allows its use whenever needed or is easily retraced when it is not needed.

The foregoing disclosure and description of the invention is illustrative and explanatory thereof. Various changes in the details of the illustrated apparatus may be made within the scope of the appended claims without departing from the true spirit of the invention. The present invention should be limited by the following claims and their legal equivalents.

I claim:

1. A food container comprising:
   a dish member having a concavity formed therein, said dish member having a connector formed on a bottom surface of said concavity;
   a base member having a bottom surface, said base member having a raised rim extending outwardly from an outer periphery of said bottom surface of said base member, said base member having a central member for detachably engaging said connector of said dish member, said base member having a liquid-receiving moat formed therein, said dish member having an upper surface nestable within said moat of said base member, said concavity of said dish member having an area larger than said central member of said base member, said concavity surrounding said central member when said upper surface of said dish member is in nested relationship with said moat of said base member; and
   a spring clip means releasably engaging an edge of said dish member and an edge of said base member when said upper surface of said dish member is in nested relationship with said moat, said spring clip means causing said upper surface to be in pressurized contact with said moat.

2. The food container of claim 1, said central member of said base member having a generally cylindrical configuration, said base member having an interior recess formed on said bottom surface, said interior recess engagable with said connector of said dish member.

3. The food container of claim 2, said central member having an outer portion slidably engaging said connector of said dish member, said dish member having an outwardly angled side wall, said dish member positioned above said base member such that said angled side wall of said dish member is separated from said rim of said base member.

4. The food container of claim 1, said central member of said base member having a generally cylindrical configuration, said central member having a surface extending across an annular interior of said central member.

5. The food container of claim 3, said angled side wall having a window area formed therein, said window area for allowing a liquid to be passed to said moat of said base member.

6. The food container of claim 1, said base member having a copper strip extending circumferentially around an exterior surface of said rim.

7. A food container comprising:
   a dish member having a concavity formed therein, said dish member having a connector formed on a bottom surface of said concavity; and
   a base member having a bottom surface, said base member having a raised rim extending outwardly from an outer periphery of said bottom surface of said base member, said base member having a central member for detachably engaging said connector of said dish member, said base member having a liquid-receiving moat formed therein, said dish member having an upper surface nestable within said moat of said base member, said central member of said base member having a generally cylindrical configuration, said central member having a surface extending across an annular interior of said central member, said surface in said central member having a hole formed therein, said base member further comprising:
   a clamp retractably positioned through said hole, said clamp connected to said base member so as to enable said base member to be attached to an exterior surface.

8. The food container of claim 7, said clamp being in resilient relationship with said base member such that said clamp can selectively move between a retracted position and an extended position through said hole.

* * * * *